(12) United States Patent
Huijsing

(10) Patent No.: US 12,216,828 B2
(45) Date of Patent: Feb. 4, 2025

(54) GESTURE CONTROL FOR OVERHEAD BINS

(71) Applicant: B/E AEROSPACE, INC., Winston Salem, NC (US)

(72) Inventor: Hans Huijsing, Ijsselstein (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 466 days.

(21) Appl. No.: 17/339,201

(22) Filed: Jun. 4, 2021

(65) Prior Publication Data
US 2021/0382561 A1 Dec. 9, 2021

Related U.S. Application Data

(60) Provisional application No. 63/035,158, filed on Jun. 5, 2020.

(51) Int. Cl.
| | |
|---|---|
| *G06F 3/01* | (2006.01) |
| *B64D 11/00* | (2006.01) |
| *G06V 40/20* | (2022.01) |
| *G07C 9/20* | (2020.01) |
| *G07C 9/23* | (2020.01) |
| *G07C 9/28* | (2020.01) |
| *B64D 45/00* | (2006.01) |
| *G07C 9/00* | (2020.01) |

(52) U.S. Cl.
CPC ............ *G06F 3/017* (2013.01); *B64D 11/003* (2013.01); *G06V 40/20* (2022.01); *G07C 9/20* (2020.01); *G07C 9/23* (2020.01); *G07C 9/28* (2020.01); *B64D 2045/007* (2013.01); *G07C 2009/00523* (2013.01); *G07C 2009/0092* (2013.01)

(58) Field of Classification Search
CPC .......... G01S 7/006; G01S 7/412; G01S 7/415; G01S 13/003; G06F 3/017; G07C 9/20; G07C 9/28; G07C 9/23; G07C 9/00182; G07C 2009/00523; G07C 2009/0092; G06V 40/20; B64D 11/003; B64D 47/02; B64D 2045/007; E05B 47/0001
See application file for complete search history.

(56) References Cited

U.S. PATENT DOCUMENTS 10,162,512 B2 * 12/2018 Seo .......................... G10L 15/22
11,262,885 B1 * 3/2022 Burckel .................. G06F 3/011
(Continued)

FOREIGN PATENT DOCUMENTS

AU          2004100165 A4 *  3/2004
BR       102018004697 B1 *  2/2023   ........... B64D 11/003
(Continued)

*Primary Examiner* — Steven P Sax
(74) *Attorney, Agent, or Firm* — SNELL & WILMER L.L.P.

(57) ABSTRACT

A system comprises an overhead bin including a door configured to open and close an opening of the overhead bin for access to and securing of an interior space of the overhead bin. A latch mechanism operatively connects the opening of the overhead bin to the door of the overhead bin to secure the door to the opening in a closed position, and to release the door from the opening for access to the interior space. A touchless input sensor can be operatively connected to the latch mechanism and a controller can be operatively connected to the latch mechanism and the touchless input sensor.

13 Claims, 3 Drawing Sheets

(56) References Cited

U.S. PATENT DOCUMENTS

| | | | | |
|---|---|---|---|---|
| 2002/0108507 | A1* | 8/2002 | May | B65F 1/1638 700/229 |
| 2006/0085308 | A1* | 4/2006 | Metzger | G07F 7/0886 705/34 |
| 2008/0086554 | A1* | 4/2008 | Royalty | H04L 63/1408 709/224 |
| 2014/0137756 | A1* | 5/2014 | Lee | B30B 15/30 100/215 |
| 2015/0360616 | A1* | 12/2015 | Shami | E05F 15/79 701/49 |
| 2017/0243449 | A1* | 8/2017 | Barboni | G06Q 10/02 |
| 2018/0265203 | A1* | 9/2018 | Agrawal | B64D 11/0696 |
| 2019/0308612 | A1* | 10/2019 | Lavoie | B62D 15/0285 |
| 2020/0103980 | A1* | 4/2020 | Katz | G06F 3/167 |
| 2020/0258135 | A1* | 8/2020 | Sternlight | G06Q 30/0611 |
| 2020/0290567 | A1* | 9/2020 | Funyak | B60R 25/102 |
| 2020/0392768 | A1* | 12/2020 | Konchan | E05B 81/76 |
| 2021/0206508 | A1* | 7/2021 | Cabos | B64D 11/0636 |
| 2021/0331812 | A1* | 10/2021 | Kiriakos | E05B 47/0004 |

FOREIGN PATENT DOCUMENTS

| | | | | |
|---|---|---|---|---|
| BR | 102018004695 B1 | * | 8/2023 | B60Q 3/30 |
| CA | 2996592 A1 | * | 9/2018 | A47F 5/08 |
| CA | 3042208 C | * | 12/2019 | G07C 9/00103 |
| CA | 3116950 A1 | * | 6/2020 | E05F 15/632 |
| CN | 102157022 B | * | 3/2014 | |
| CN | 205812234 U | * | 12/2016 | |
| CN | 106447325 A | * | 2/2017 | G06Q 20/3278 |
| CN | 106774822 A | * | 5/2017 | |
| CN | 107682632 A | * | 2/2018 | |
| CN | 108875491 A | * | 11/2018 | G06F 21/32 |
| CN | 109670420 A | * | 4/2019 | G06K 9/00302 |
| CN | 105264524 B | * | 8/2019 | G06F 16/3344 |
| DE | 102016103612 A1 | * | 9/2016 | B60K 35/00 |
| DE | 102019212620 A1 | * | 2/2021 | B61D 37/00 |
| EP | 3335991 A1 | * | 6/2018 | B61D 37/003 |
| EP | 3501985 A1 | * | 6/2019 | B64D 11/0015 |
| JP | 2004362283 A | * | 12/2004 | |
| JP | 2021038618 A | * | 3/2021 | |
| JP | 7248216 B2 | * | 3/2023 | |
| KR | 20140062233 A | * | 5/2014 | |
| WO | WO-2016042074 A1 | * | 3/2016 | B61D 19/00 |

* cited by examiner

GESTURE CONTROL FOR OVERHEAD BINS

CROSS-REFERENCE TO RELATED APPLICATIONS

This application claims priority to and the benefit of U.S. Provisional Patent Application No. 63/035,158, filed Jun. 5, 2020, the entire content of which is incorporated herein in its entirety.

BACKGROUND

1. Field

The present disclosure relates generally to aircraft interiors and more specifically to opening and closing components such as overhead bins.

2. Description of Related Art

The COVID-19 outbreak has raised the demands of disinfection, social distancing, and other measures to reduce the spread of pathogens in aircraft cabins and the objects within. There is an ongoing need for improved systems and methods to reduce the spread of antigens aboard aircraft providing service to the crew, ground personnel, and passengers. This disclosure provides a solution for this need.

SUMMARY

A system comprises an overhead bin including a door configured to open and close an opening of the overhead bin for access to and securing of an interior space of the overhead bin. A latch mechanism operatively connects the opening of the overhead bin to the door of the overhead bin to secure the door to the opening in a closed position, and to release the door from the opening for access to the interior space. A touchless input sensor can be operatively connected to the latch mechanism and a controller can be operatively connected to the latch mechanism and the touchless input sensor. The controller includes machine readable instructions configured to cause the controller to release the latch mechanism for releasing the door from the opening upon receipt of touchless input from a user by the touchless input sensor.

In embodiments, the machine readable instructions can be configured to cause the controller to start a timer upon detection of presence of a user input gesture, delay release of the latch mechanism until continuous presence of the user input gesture is detected while the timer runs, and release the latch mechanism only upon expiration of the timer if the user input gesture was continuously detected by the touchless input sensor while the timer ran.

An output display can be operatively connected to the controller such that the machine readable instructions can be configured to cause the controller to display an indicator of status of the timer. A server can be operatively connected to the controller to send signals to the controller such that the machine readable instructions can be configured to cause the controller to ignore user input to the touchless input sensor upon receipt of a signal from the server indicative of a certain phases of a flight.

In embodiments, the overhead bin can be one of a plurality of similar overhead bins, and wherein the server is configured to send signals to the respective controllers of the overhead bins to unlatch bins per row or section, and to prevent unlatching of others of the overhead bins. In certain embodiments, the controllers can be configured to signal a crew member if a gesture is detected by a respective touchless input sensor when unauthorized. In certain embodiments, the latch mechanism can include an actuator connecting between the door and the opening to actively drive the door closed and open based on command signals from the controller.

In certain embodiments, the touchless input sensor can include a camera and the machine readable instructions can be configured to cause the controller to recognize a gesture in image data from the camera to release the latch mechanism. In certain embodiments, the machine readable instructions can be configured to cause the controller to recognize an authorization code in the image data and to release the latch mechanism upon recognition of the authorization code.

In certain embodiments, the touchless input sensor includes a radio frequency identification (RFID) reader and/or near-field communication (NFC) reader. In embodiments, the machine readable instructions can be configured to cause the controller to recognize an authorization code from an RFID and/or NFC device, respectively, and to release the latch mechanism upon recognition of the authorization code.

In certain embodiments, a method comprises releasing a latch mechanism for releasing a door from an opening of an overhead bin upon receipt of touchless input from a user by a touchless input sensor. In embodiments, releasing the latch can include starting a timer upon detection of presence of a user input gesture, delaying release of the latch mechanism until continuous presence of the user input gesture is detected while the timer runs, releasing the latch mechanism only upon expiration of the timer if the user input gesture was continuously detected by the touchless input sensor while the timer ran.

In embodiments, the method can include displaying an indicator of status of the timer. In embodiments, the method can include ignoring user input to the touchless input sensor upon receipt of a signal from the server indicative of a certain phases of a flight.

In embodiments, the method can include sending signals to respective controllers of the overhead bins to unlatch bins per row or section, and to prevent unlatching of others of the overhead bins. In embodiments, the method can include signaling a crew member if a gesture is detected by a respective touchless input sensor when unauthorized. In embodiments, the method can include touchlessly actuating the door to a closed position.

In embodiments, the method can include recognizing a gesture in image data from a camera to release the latch mechanism. In embodiments, the method can include recognizing an authorization code in the image data and releasing the latch mechanism upon recognition of the authorization code, recognizing an authorization code from an RFID and/or NFC device, releasing the latch mechanism upon recognition of the authorization code.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
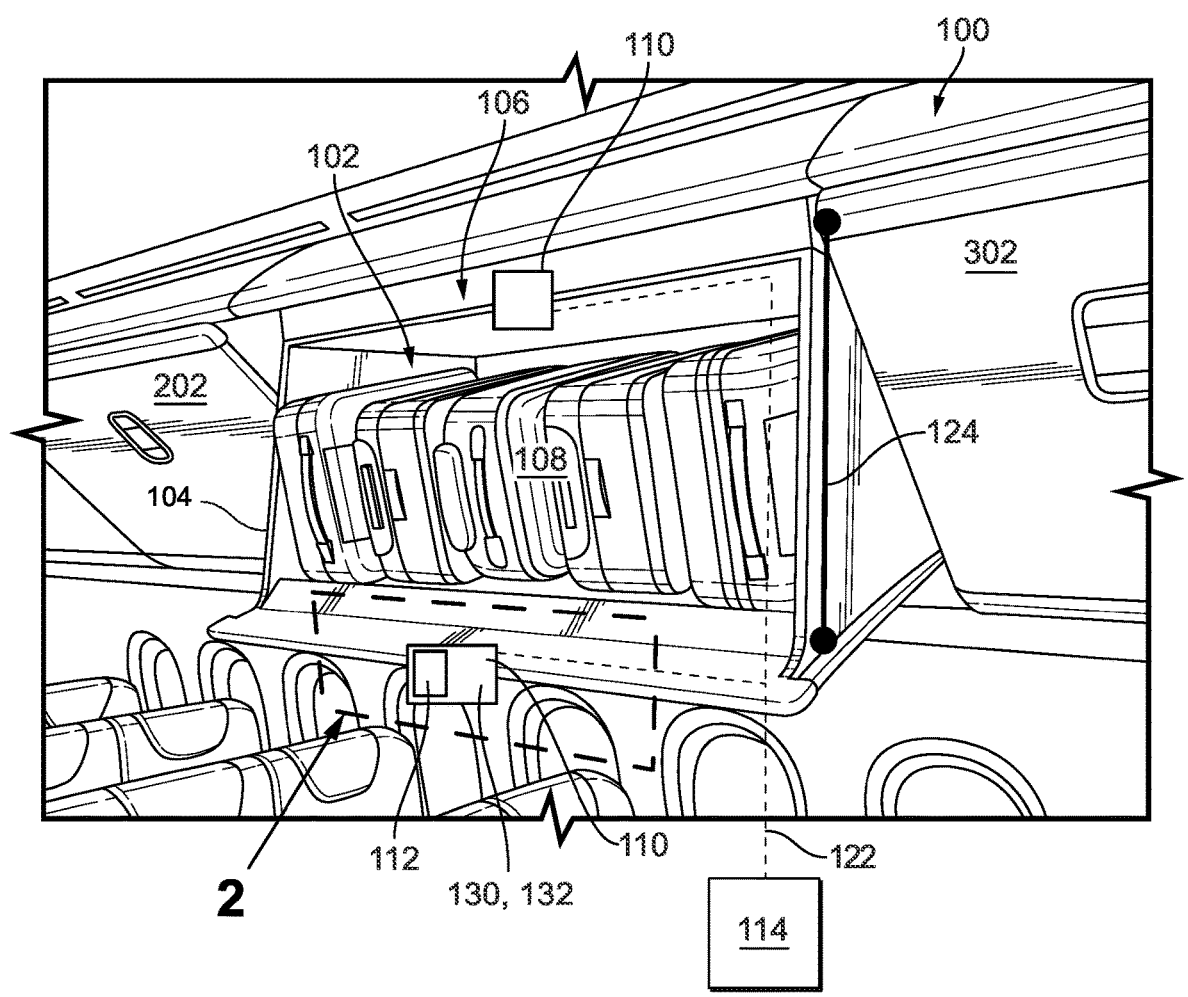
FIG. 1 is a schematic perspective view of an embodiment of an overhead bin constructed in accordance with the present disclosure, showing a gesture control system.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to gesture operate overhead bins, for example in commercial passenger vehicles. This can provide for touchless opening of overhead bins, e.g. for reduction of spread of contagions.

Overhead bins can create shared contact surfaces, for example the latches which require each user to physically touch the latch to operate the bin. However, shared contact surfaces provide an opportunity for spreading pathogens between passengers and crew. Accordingly, eliminating the need for physical contact for operating the overhead bins, e.g. using system 100 can help prevent the spread of pathogens on commercial passenger vehicles such as aircraft.

The system 100 includes an overhead bin 102. The overhead bin 102 includes a door 104 configured to open and close an opening 106 of the overhead bin 102 for access to and securing of an interior space 108 of the overhead bin 102. A latch mechanism 110 operatively connects the opening 106 to the door 104 in the closed position, and is configured to release the door 104 from the opening 106 for access to the interior space 108.

In certain embodiments, the door 104 can biased to open relative to the opening 106 upon release of the latch mechanism 110. For example, a the overhead bin 102 can include at least one biasing member such as a biasing spring, or the bias can be achieved by orienting the overhead bin 102 so that opening is assisted by the force of gravity.

A touchless input sensor 112 can be operatively connected to the latch mechanism 110 and a controller 114 can be operatively connected to both the latch mechanism 110 and the touchless input sensor 112. The controller 114 includes machine readable instructions configured to cause the controller to release the latch mechanism 110, thereby releasing the door 104 from the opening 106 upon receipt of touchless input from a user 101 by the touchless input sensor 112.

Figure 2:
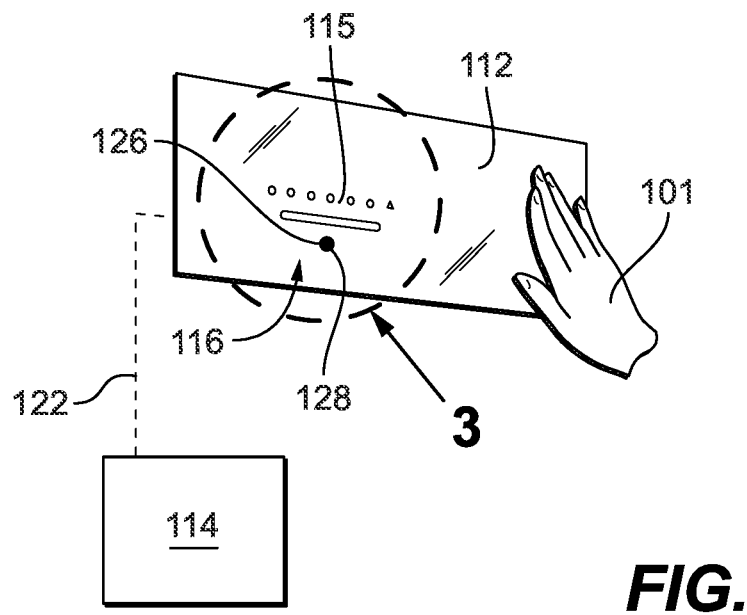
FIG. 2 is an enlarged schematic partial view of the overhead bin of FIG. 1, showing a user interact with a touchless sensor.

In embodiments, the machine readable instructions can be configured to cause the controller 114 to start a timer 115 upon detection of presence of a user input gesture. The timer can be any suitable duration, for example between 2 and 10 seconds, or about 5 seconds. The controller 114 can delay release of the latch mechanism 110 until continuous presence of the user input gesture is detected while the timer 115 runs, and release the latch mechanism 110 only upon expiration of the timer 115 and if the user input gesture was continuously detected by the touchless input sensor 112 while the timer ran. In embodiments, the gesture can be a user holding their hand still proximate to the senor 112, or any other suitable gesture such as waving as shown in FIG. 2. In this manner, the controller will not release the latch mechanism accidentally or upon a passenger or crew walking past the sensor 112, for example.

Figure 3:
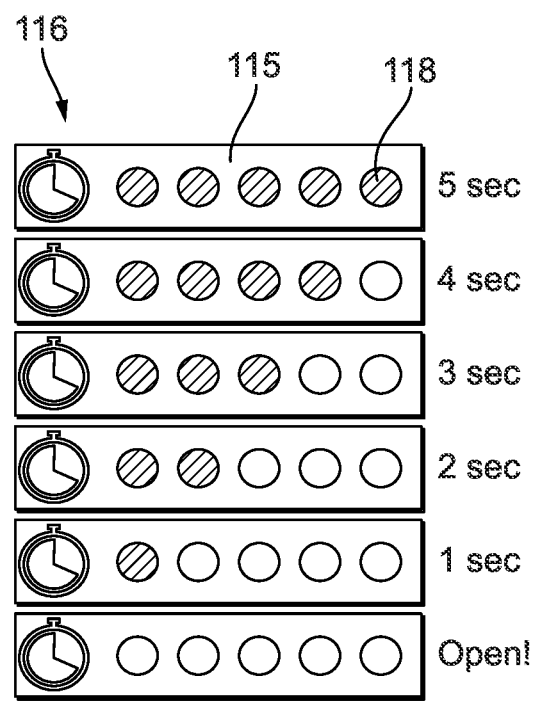
FIG. 3 is an enlarged schematic partial view of the overhead bin of FIG. 1, showing an output display.

As shown in FIGS. 2-3, an output display 116 can be operatively connected to the controller 114 such that the controller 114 can display an indicator of status 118 of the timer. The output display 116 can be visual, such as shown, or can be audible (e.g. beeps, countdown, or the like) or any suitable combination of audible and visual. A server 120 can be operatively connected to the controller 114 to send signals 122 to the controller 114 to cause the controller 114 to ignore user input to the touchless input sensor 112 upon receipt of signals 122 from the server 120 indicative of a certain phases of a flight, such as taxiing, takeoff, landing, turbulence, emergency maneuvering, and any other phase of a flight where it is inadvisable to have open overhead bins, or when a fasten seatbelt sign is on.

In embodiments, the overhead bin 102 can be one of a plurality of similar overhead bins 202, 302, where the server 120 is configured to send signals 122 to the respective controllers 114 of the overhead bins to unlatch bins per row or section, and to prevent unlatching certain overhead bins, for example to enforce social distancing, and/or order of boarding and deboarding. In certain embodiments, the controllers 114 can be configured to signal a crew member 103 if a gesture is detected by a respective touchless input sensor 112 when unauthorized, for example to alert the crew 103 if a passenger 101 is trying to open an overhead bin 102 during a certain stage of flight.

In certain embodiments, the latch mechanism 110 can include an actuator 124 connecting between the door 104 and the opening 106 to actively drive the door 104 open and closed based on command signals 122 from the controller 114. The actuator 124 allow the system 100 to be completely touchless.

In certain embodiments, the touchless input sensor 112 can include a camera 126 where the controller can recognize a gesture in image data 128 from the camera 126 to release the latch mechanism 110 (e.g. as shown in FIG. 2). In certain embodiments, the controller 114 can be configured to recognize an authorization code (e.g. a bar code or biometrics, such as facial recognition) in the image data 128 and to release the latch mechanism 110 upon recognition of the authorization code.

In certain embodiments, the touchless input sensor 112 can include a radio frequency identification (RFID) reader 130 and/or near-field communication (NFC) reader 132, where the controller 114 is configured to recognize an authorization code from an RFID and/or NFC device (such as in a passenger device or a respective RFID/NFC tag associated with a passenger's ticket), respectively, and to release the latch mechanism 110 upon recognition of the authorization code.

Figure 4:
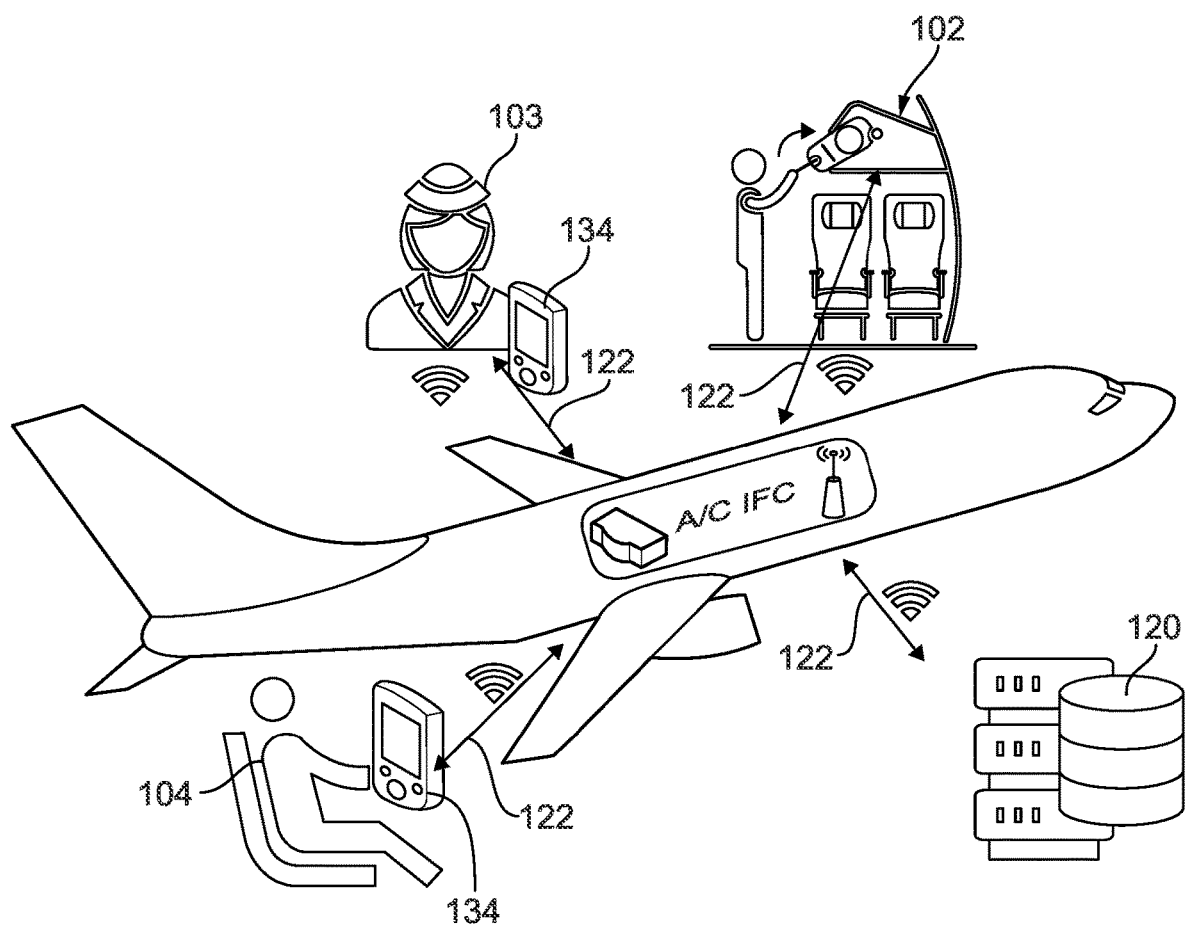
FIG. 4 is a schematic perspective view of the gesture control system of FIGS. 1-3 showing an integration with a wireless overhead bin control system.

In certain embodiments, such as shown in FIG. 4, the RFID and NFC readers can be used in conjunction with a mobile application installed on a passenger device 134. The system 100 and mobile app integration can be used, for example, to allow a passenger 101 can buy additional storage space through the mobile application, where the purchase will provide the passenger with authorization for the additional overhead bin(s) to open the dedicated bin with the same application on their mobile device (e.g. device 134). For example, the server 120 can wirelessly connect between the wireless device 120 and the wireless receivers of the controllers 114 for controlling the overhead bins 102 from the wireless device 134. The wireless passenger device 134, the server 12, and the controllers 114 can be configured for the server 120 to accept commands 122 from each wireless passenger device 120 to open only one or more overhead bins for which the passenger is authorized, either by seat location or additional purchase.

In certain embodiments, a method comprises releasing a latch mechanism 110 for releasing a door 104 from an opening 106 of an overhead bin 102 upon receipt of touchless input from a user 101 by a touchless input sensor 112. In embodiments, releasing the latch 110 can include starting a timer upon detection of presence of a user input gesture, delaying release of the latch mechanism 110 until continuous presence of the user input gesture is detected while the timer runs, releasing the latch mechanism 110 only upon expiration of the timer if the user input gesture was continuously detected by the touchless input sensor 112 while the timer ran.

In embodiments, the method can include displaying (e.g. on display 116) an indicator of status of the timer. In embodiments, the method can include ignoring user input to the touchless input sensor 112 upon receipt of a signal 122 from a server 120 indicative of a certain phases of a flight.

In embodiments, the method can include sending signals 122 to respective controllers 114 of the overhead bins 102, 202, 302 to unlatch bins per row or section, and to prevent unlatching certain other overhead bins. In embodiments, the method can include signaling a crew member 103 if a gesture is detected by a respective touchless input sensor 112 when unauthorized. In embodiments, the method can include touchlessly actuating the door 104 to a closed position (e.g. via actuator 124).

In embodiments, the method can include recognizing a gesture in image data 128 from a camera 126 to release the latch mechanism 110. In embodiments, the method can include recognizing an authorization code in the image data 128 and releasing the latch mechanism 110 upon recognition of the authorization code (e.g. recognizing an authorization code from an RFID and/or NFC device), and releasing the latch mechanism 110 upon recognition of the authorization code.

The methods and systems of the present disclosure, as described above and shown in the drawings, provide for touch free opening of overhead bins, thus reducing the change of cross-contamination through touchable surfaces. Additionally, the opening of bins can be opened by flight crew in a controlled manner to enforce a certain de-boarding order.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

While the apparatus and methods of the subject disclosure have been shown and described, those skilled in the art will readily appreciate that changes and/or modifications may be made thereto without departing from the scope of the subject disclosure.

What is claimed is:

1. A system comprising:
    an overhead bin including a door configured to open and close an opening of the overhead bin for access to and securing of an interior space of the overhead bin;
    a latch mechanism operatively connecting the opening of the overhead bin to the door of the overhead bin to secure the door to the opening in a closed position, and to release the door from the opening for access to the interior space;
    a touchless input sensor, wherein the touchless input sensor includes a radio frequency identification (RFID) reader and/or a near-field communication (NFC) reader;
    a server; and
    a controller operatively connected to the latch mechanism, the touchless input sensor, and the server, wherein the controller includes machine readable instructions configured to cause the controller to:
        detect whether a signal from the server is present, wherein the signal is indicative of a phase of flight during which opening of the overhead bin is inadvisable;
        ignore a touchless user input gesture in response to the presence of the signal;
        allow detecting of a presence of a user input gesture in response to an absence of the signal;
        detect the presence of the touchless user input gesture;
        start a timer in response to the detecting of the user input gesture; and
        recognize an authorization code from an RFID device and/or an NFC device, wherein the authorization code is at least one of a tag associated with a passenger ticket or a mobile application installed on a passenger device;
        verify whether the overhead bin is associated with the authorization code based on at least one of a seat assignment or an additional purchase of bin space;
        release the latch mechanism in response to an expiration of the timer, recognition of the authorization code, and verification of the authorization code if the touchless user input gesture was continuously detected by the touchless input sensor while the timer ran.

2. The system as recited in claim 1, further comprising an output display operatively connected to the controller, wherein the machine readable instructions are configured to cause the controller to:
    display an indicator of status of the timer.

3. The system as recited in claim 1, wherein the overhead bin is one of a plurality of similar overhead bins, and wherein the server is configured to send signals to the respective controllers of the overhead bins to unlatch the overhead bins per row or section in an order consistent with at least one of an order of passenger boarding or an order of passenger deboarding, and to prevent unlatching of others of the overhead bins.

4. The system as recited in claim 3, wherein the controllers are configured to signal a crew member in response to the touchless user input gesture being present during the phase of flight during which opening of the overhead bin is inadvisable.

5. The system as recited in claim 1, wherein the latch mechanism includes an actuator connecting between the door and the opening to actively drive the door closed and open based on command signals from the controller.

6. The system as recited in claim 1, wherein the touchless input sensor includes a camera, and wherein the machine readable instructions are configured to cause the controller to recognize a gesture in image data from the camera to release the latch mechanism.

7. The system as recited in claim 6, wherein the machine readable instructions are configured to cause the controller to recognize an authorization code in the image data and to release the latch mechanism upon recognition of the authorization code.

8. A method comprising:
 releasing a latch mechanism for releasing a door from an opening of an overhead bin upon receipt of touchless input from a user by a touchless input sensor, wherein releasing the latch includes:
  detecting whether a signal from the server is present, wherein the signal is indicative of a phase of flight during which opening of the overhead bin is inadvisable;
  ignoring a touchless user input gesture in response to the presence of the signal;
  allowing detection of the touchless user input gesture in response to an absence of the signal;
  detecting a presence of the touchless user input gesture in image data from a camera;
  recognizing an authorization code in the image data, wherein the authorization code is at least one of a tag associated with a passenger ticket or a mobile application installed on a passenger device;
  verifying whether the overhead bin is associated with the authorization code based on at least one of a seat assignment or an additional purchase of bin space;
  starting a timer upon the detection of the presence of the touchless user input gesture;
  delaying release of the latch mechanism until continuous presence of the user input gesture is detected while the timer runs; and
  releasing the latch mechanism only upon expiration of the timer, recognition of the authorization code, and verification of the authorization code if the user input gesture was continuously detected by the touchless input sensor while the timer ran.

9. The method as recited in claim 8, further comprising displaying an indicator of status of the timer.

10. The method as recited in claim 8, wherein the overhead bin is one of a plurality of similar overhead bins, and further comprising sending signals to respective controllers of the overhead bins to unlatch the overhead bins per row or section in an order consistent with at least one of an order of passenger boarding or an order of passenger deboarding, and to prevent unlatching of others of the overhead bins.

11. The method as recited in claim 10, further comprising signaling a crew member in response to the touchless user input gesture being present during the phase of flight during which opening of the overhead bin is inadvisable.

12. The method as recited in claim 8, further comprising touchlessly actuating the door to a closed position.

13. The method as recited in claim 8, further comprising:
 recognizing an authorization code from an RFID and/or NFC device; and
 releasing the latch mechanism upon recognition of the authorization code.

* * * * *

UNITED STATES PATENT AND TRADEMARK OFFICE
CERTIFICATE OF CORRECTION

PATENT NO. : 12,216,828 B2
APPLICATION NO. : 17/339201
DATED : February 4, 2025
INVENTOR(S) : Hans Huijsing Page 1 of 1

It is certified that error appears in the above-identified patent and that said Letters Patent is hereby corrected as shown below:

In the Claims

Claim 8, at Column 9, Line 36 please delete the words "in" and "put" and insert the word --input--

Signed and Sealed this
Twenty-sixth Day of August, 2025

Coke Morgan Stewart
*Acting Director of the United States Patent and Trademark Office*